United States Patent
Cho et al.

(10) Patent No.: US 7,450,942 B2
(45) Date of Patent: Nov. 11, 2008

(54) APPARATUS AND METHOD FOR SELECTING AN ACCESS NETWORK IN A MULTI-WIRELESS COMMUNICATION NETWORK

(75) Inventors: Sung-Hyun Cho, Seoul (KR); Sang-Boh Yun, Seongnam-si (KR); Young-Soo Kim, Seoul (KR); Won-Hyoung Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 629 days.

(21) Appl. No.: 10/777,306

(22) Filed: Feb. 12, 2004

(65) Prior Publication Data
US 2004/0192375 A1    Sep. 30, 2004

(30) Foreign Application Priority Data
Mar. 25, 2003    (KR)    .................. 10-2003-0018529

(51) Int. Cl.
*H04Q 7/24*    (2006.01)
(52) U.S. Cl. .................. 455/435.2; 455/432.1
(58) Field of Classification Search .......... 455/432.1–3, 455/435.1–3, 445
See application file for complete search history.

(56) References Cited

U.S. PATENT DOCUMENTS

| 6,400,946 | B1 | 6/2002 | Vazvan et al. | 455/432.1 |
| 6,754,482 | B1 * | 6/2004 | Torabi | 455/432.3 X |
| 6,799,038 | B2 * | 9/2004 | Gopikanth | 455/435.2 |

FOREIGN PATENT DOCUMENTS

CN    1395385    2/2003

* cited by examiner

*Primary Examiner*—Philip J Sobutka
(74) *Attorney, Agent, or Firm*—The Farrell Law Firm PC (57) ABSTRACT

An apparatus selects an access network in a mobile station capable of receiving a service from a multi-wireless communication network. The apparatus comprises a physical layer capable of communicating with the multi-wireless communication network; an access network selector for storing information on an available network in the multi-wireless communication network and selecting a network during communication and handoff; and a higher layer for providing the information stored in the access network selector to a user, and delivering selection information of a particular network in the multi-wireless communication network to the access network selector according to a method set by the user.

6 Claims, 8 Drawing Sheets

APPARATUS AND METHOD FOR SELECTING AN ACCESS NETWORK IN A MULTI-WIRELESS COMMUNICATION NETWORK

PRIORITY

This application claims priority under 35 U.S.C. § 119 to an application entitled "Apparatus and Method for Selecting Access Network in a Multi-Wireless Communication Network" filed in the Korean Intellectual Property Office on Mar. 25, 2003 and assigned Serial No. 2003-18529, the contents of which are incorporated herein by reference.

BACKGROUND OF THE INVENTION

1. Field of the Invention

The present invention relates generally to an apparatus and method for performing a access network selection in a wireless communication system, and in particular, to an apparatus and method for selectively accessing a wireless communication network in a multi-wireless communication network including a plurality of wireless communication systems.

2. Description of the Related Art

In general, cellular systems, typical wireless communication systems, are classified into a synchronous CDMA (Code Division Multiple Access) system and an asynchronous UMTS (Universal Mobile Telecommunications System) system. Such cellular systems have developed from an early system mainly providing a voice communication service into an improved high-speed data system and a system providing a data service and a voice service together at high speed. In addition, a GPS (Global Positioning System) system and a wireless LAN (Local Area Network) system are currently being used, and it is expected that more diversified systems will appear in the future.

Particularly, for a cellular network, active research has been carried out on hierarchical structure-based systems in order to provide various types of services and increase network efficiency. A hierarchical structure-based cellular network diversifies coverage of cells and controls the diversified cell coverage on a hierarchical basis. Until recently, research has been mainly conducted on a hierarchical structure-based system for a single network.

Figure 1:
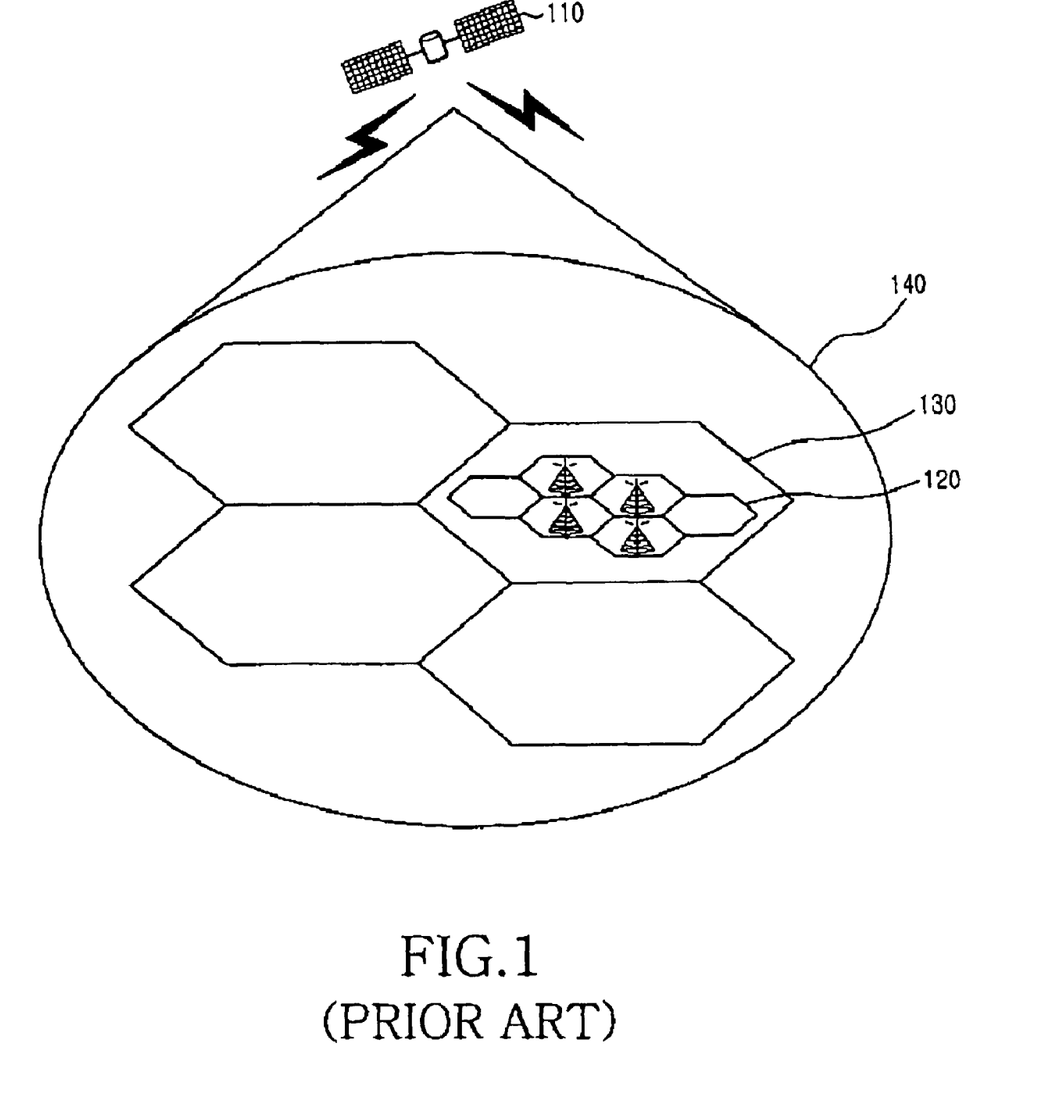
FIG. 1 is a diagram illustrating an hierarchical network configuration consisted of a cellular system and a satellite system.

FIG. 1 is a diagram illustrating a method for providing a currently available service by a cellular system and a satellite system. As illustrated in FIG. 1, a cellular system has manifold cells and groups cells being similar in coverage into one layer. That is, FIG. 1 illustrates a cellular system having Pico cells 120 or a cellular system having microcells 130. Alternatively, the Pico cells and the microcells may coexist in a single system. That is, cells having different sizes may exist in one system. In addition, a wide coverage 140 can be defined as a communication area covered by a satellite 110 without discrimination of cells. Generally, however, one network groups cells having similar coverage in size into one layer.

Accordingly, such a hierarchical structure-based cellular system has various proposed methods for access network selection by appropriately selecting a higher layer cell or a lower layer cell according to a characteristic of a user. A conventional selection method includes a method for selecting a call connection layer according to a moving speed of a user. This method selects a cell layer according to a traveling velocity of the user. For example, when a moving speed of a user does not exceed a predetermined threshold, a call is assigned to a cell having a small coverage such as a microcell or a picocell. However, when the moving speed of a user exceeds the predetermined threshold, a call is assigned to a cell having a large coverage such as a microcell to prevent frequent occurrence of handoff and deterioration of service quality due to the frequent handoff. This method has the advantage of reducing frequency of the occurrence of handoff by utilizing a hierarchical cell structure, thereby contributing to efficient utilization of network resources.

Another access network selection method in the hierarchical structure-based cellular system includes a selection method considering inter-layer traffic distribution. When a mobile station is located in a cell-overlapping region (or handoff region), the selection method chooses a best cell layer from several cell layers for performance improvement and stable service of a network considering inter-layer traffic distribution, and compulsorily performs a handoff, when necessary. This method is advantageous in that network efficiency and service quality can be simultaneously considered.

However, the above-stated methods are all characterized in that cell selection for call connection is performed by a network rather than a user. In a next generation mobile communication network, various types of wireless access networks coexist, and the type and quality of services provided will be more diversified. Therefore, when the existing network-centered access network selection method is used intently, there is high probability that a call control procedure will become very complicated. In addition, the network-centered selection method cannot sufficiently reflect different personal requests of the users. Furthermore, when different wireless systems coexist, compatibility between them is not secured.

SUMMARY OF THE INVENTION

It is, therefore, an object of the present invention to provide an apparatus and method for selecting a user-centered access network when a plurality of different wireless communication networks coexist.

It is another object of the present invention to provide an apparatus and method for selecting a different access network by each user when a plurality of different wireless communication networks coexist.

It is further another object of the present invention to provide an apparatus and method for selecting an access network without an increase in complexity of a network when a plurality of different wireless communication networks coexist.

In accordance with one aspect of the present invention, there is provided an apparatus for selecting an access network in a mobile station capable of receiving a service from a multi-wireless communication network. The apparatus comprises: a physical layer capable of communicating with the multi-wireless communication network; an access network selector for storing information on an available network in the multi-wireless communication network and selecting a network during communication and handoff; and a higher layer for providing the information stored in the access network selector to a user, and delivering selection information of a particular network in the multi-wireless communication network to the access network selector according to a method set by the user.

Further, the apparatus comprises a display unit for displaying the information to be provided from the higher layer to the user, and a memory for storing a selection criterion of the multi-wireless communication network and a handoff method for every available service.

In accordance with another aspect of the present invention, there is provided a method for selecting an access network in a mobile station capable of receiving a service from a multi-wireless communication network. The method comprises the steps of: during an initial drive, detecting available access nodes, mapping the detected available access nodes, and storing the mapping results in a mapping table; and when communication is requested, providing a user with information on an available network out of information stored in the mapping table, and communicating with a particular access network selected by the user.

Further, the method comprises the steps of: when a handoff is necessary during communication, detecting an available handoff target network from the mapping table, if vertical handoff is necessary; if a handoff method is set to an automatic mode, selecting a handoff target network from the detected available handoff target networks automatically; and if a handoff method is set to a manual mode, providing the user with information on the detected available handoff target networks and performing handoff to a network selected by the user.

Further, the method comprises the step of performing, if there is one available handoff target network, handoff to the network.

Further, the method comprises the step of determining a predetermined particular network as a basic network when communication is terminated.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 2:
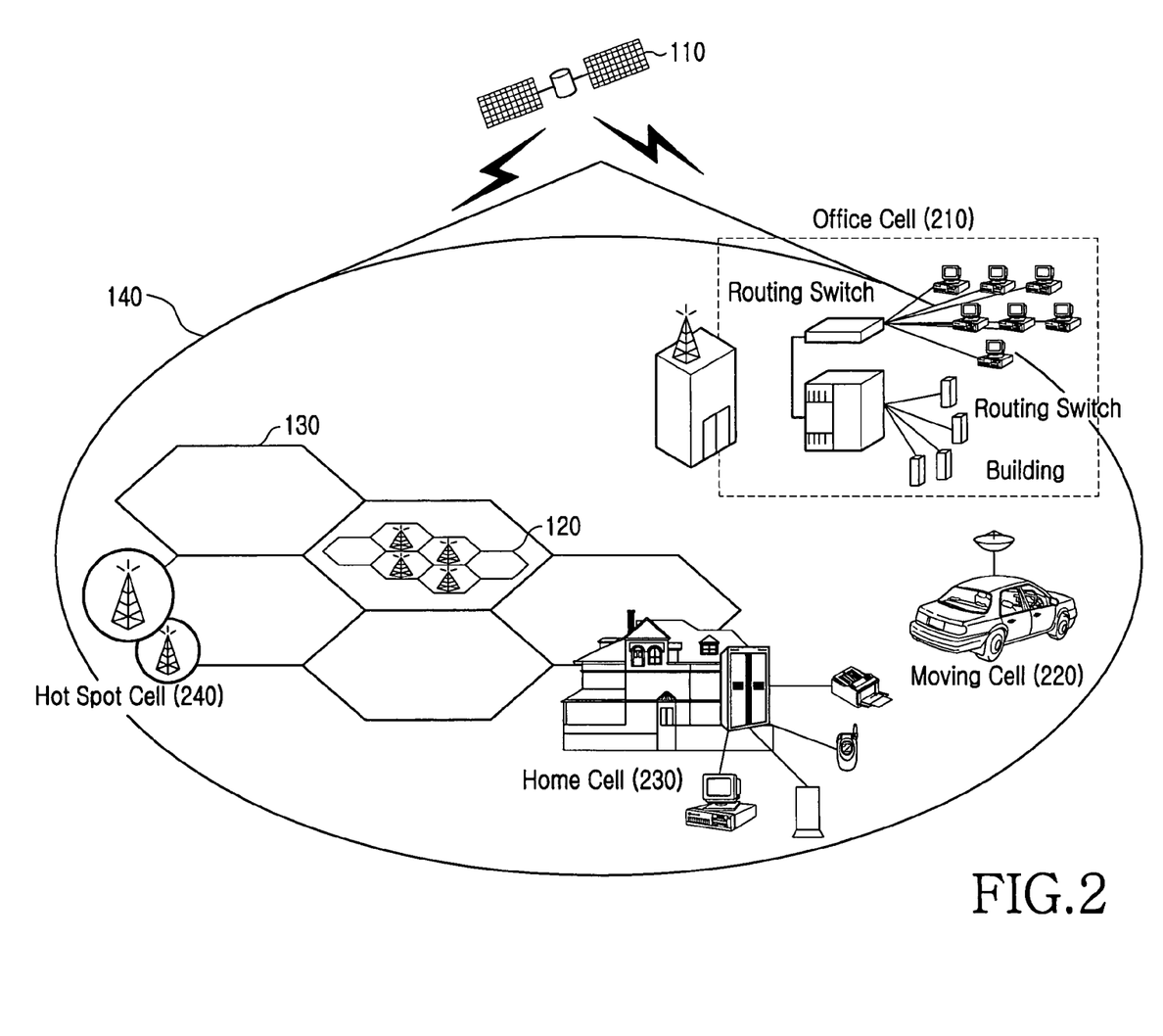
FIG. 2 is a diagram schematically illustrating a network configuration in which several different access networks coexist according to the present invention.

FIG. 2 is a diagram schematically illustrating a network configuration in which several different access networks coexist according to the present invention. Configurations and characteristics of different access networks will now be described with reference to FIG. 2. Herein, a group of several different access networks will be referred to as a "multi-wireless communication network."

In FIGS. 1 and 2, the same reference numerals denote the same service areas formed by a cellular system and a satellite system. That is, the cellular system has picocells 120, microcells 130, microcells, and a wide coverage 140 covered by a satellite 110. In addition, the cellular system may include an office cell 210, which is expected to be further developed in the future. The "office cell" refers to a network designed to be used only in a particular building or a particular region, and is currently being used in some instances. Such a service is expected to be more popularly used in the future. Further, the cellular system may have a moving cell 220 as another kind of a wireless communication network, the moving cell 220 being moved by a transportation means such as a bus or an automobile. Also, such a moving cell 220 has its unique coverage within which a wireless service can be provided. Furthermore, the cellular system may include a home cell 230, which is an advanced type of a DECT (Digital European Cordless Telephone) system currently being provided as a wireless LAN or European LAN. Moreover, the cellular system may include a hot spot cell 240 providing only data to a data phone such as a PDA (Personal Digital Assistant), and in the future, the hot spot cell 240 will provide a voice service as well.

Only the currently available networks and other networks, which are now under development, have been described with reference to FIG. 2. However, in the future, more diversified types of networks will be developed in addition to the networks illustrated in FIG. 2, to secure various accounting systems and various service qualities. Accordingly, there is a demand for a method capable of selecting a desired network according to a preference and a request of each individual.

Figure 3:
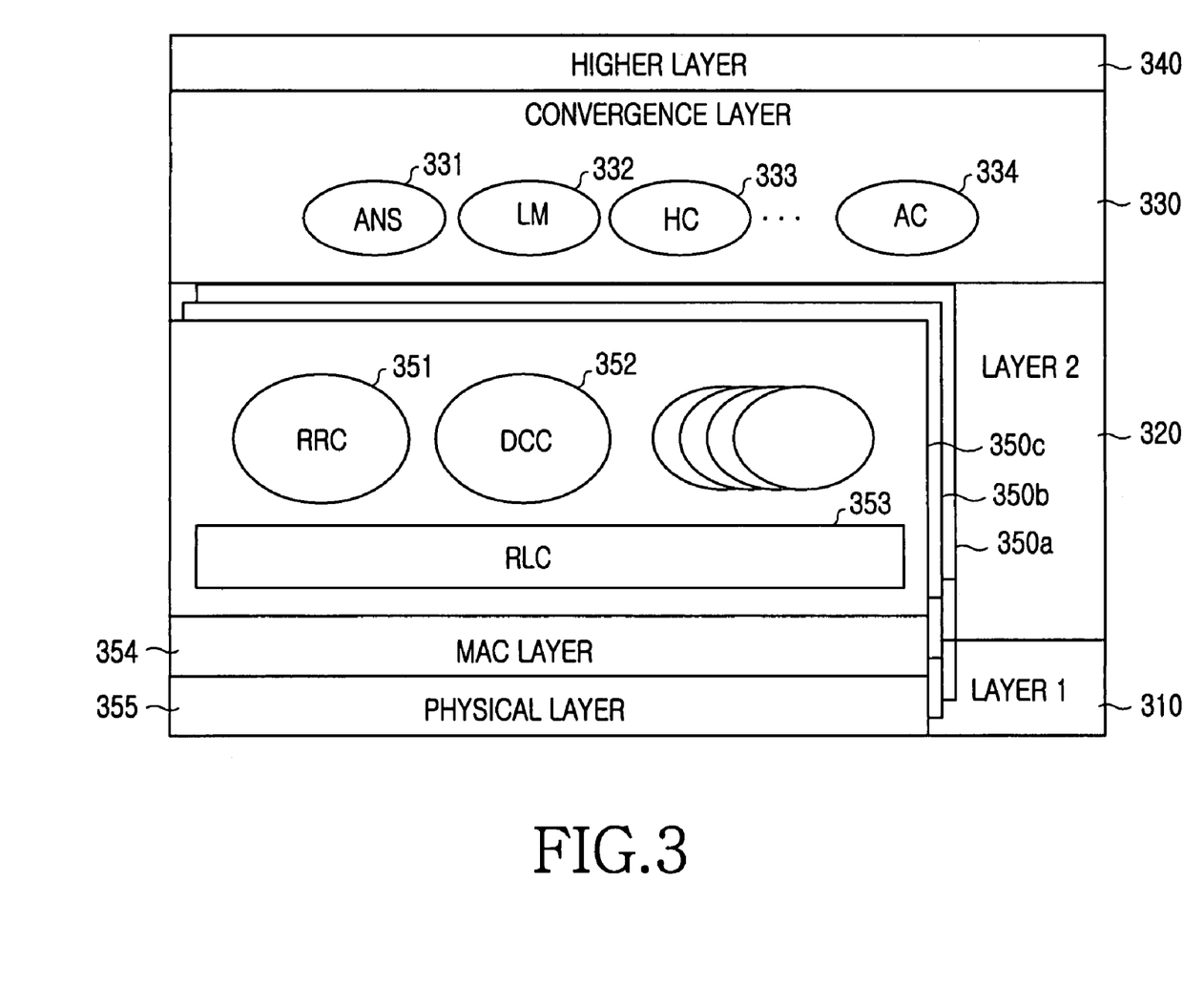
FIG. 3 is a block diagram illustrating function blocks for access network selection based on a hierarchical structure of a mobile station according to a preferred embodiment of the present invention.

FIG. 3 is a block diagram illustrating function blocks for access network selection based on a hierarchical structure of a mobile station according to a preferred embodiment of the present invention. With reference to FIG. 3, a description will be made of a structure and operation of function blocks based on a hierarchical structure of a mobile station, for accessing various access networks, which will be serviced in the future, according to the present invention.

FIG. 3 illustrates only parts that need description related to the present invention. Therefore, the parts that do not need description are excluded from the hierarchical structure, and even in each layer, only the necessary function blocks are illustrated. The hierarchical structure of a mobile station is divided into Layer 1 (L1) 310, Layer 2 (L2) 320, a convergence layer 330, and a higher layer 340. The Layer 1 310 indicates a physical layer 335. The Layer 2 320 includes a MAC (Medium Access Control) layer 354 and a radio link controller (RLC) 353, and further includes an radio resource controller (RRC) 351 and a data-link connection controller (DCC) 352. The Layer 2 320 may include other function blocks. However, because they are not related to the present invention, a detailed description thereof will not be provided.

The convergence layer 330 includes at least an access network selector (ANS) 331. The access network selector 331 performs interfacing between the higher layer 340 and the Layer 2 320, and adjusts a class of respective services. Further, the access network selector 331 maps an access network to a user's menu, and manages information on available (or connectable) access networks. In addition, the access network selector 331 manages a user's plan, i.e., information on an access network the user desires to access. For such operations, the access network selector 331, acquires necessary information from a location manager (LM) 332, a handoff controller (HC) 333, and an admission controller (AC) 334. The location manager 332, the handoff controller 333, and the admission controller 334 are included in the convergence layer 330.

The higher layer 340 and the access network selector 331 perform a control operation according to the present invention. A detailed description of operations of the higher layer 340 and the access network selector 331 will be made later with reference to FIGS. 4, 5A, 5B, 6A and 6B. Although FIG. 3 illustrates the function blocks in the hierarchical structure defined in 3GPP ($3^{rd}$ Generation Partnership Project) and 3GPP2 ($3^{rd}$ Generation Partnership Project 2), the respective function blocks can be designed so as to operate in different layers.

Additionally, the mobile station, though not illustrated in FIG. 3, includes a display unit for user interfacing, a user input interface unit for inputting a user's command, an internal memory, and physical logics for wireless communication.

Figure 4:
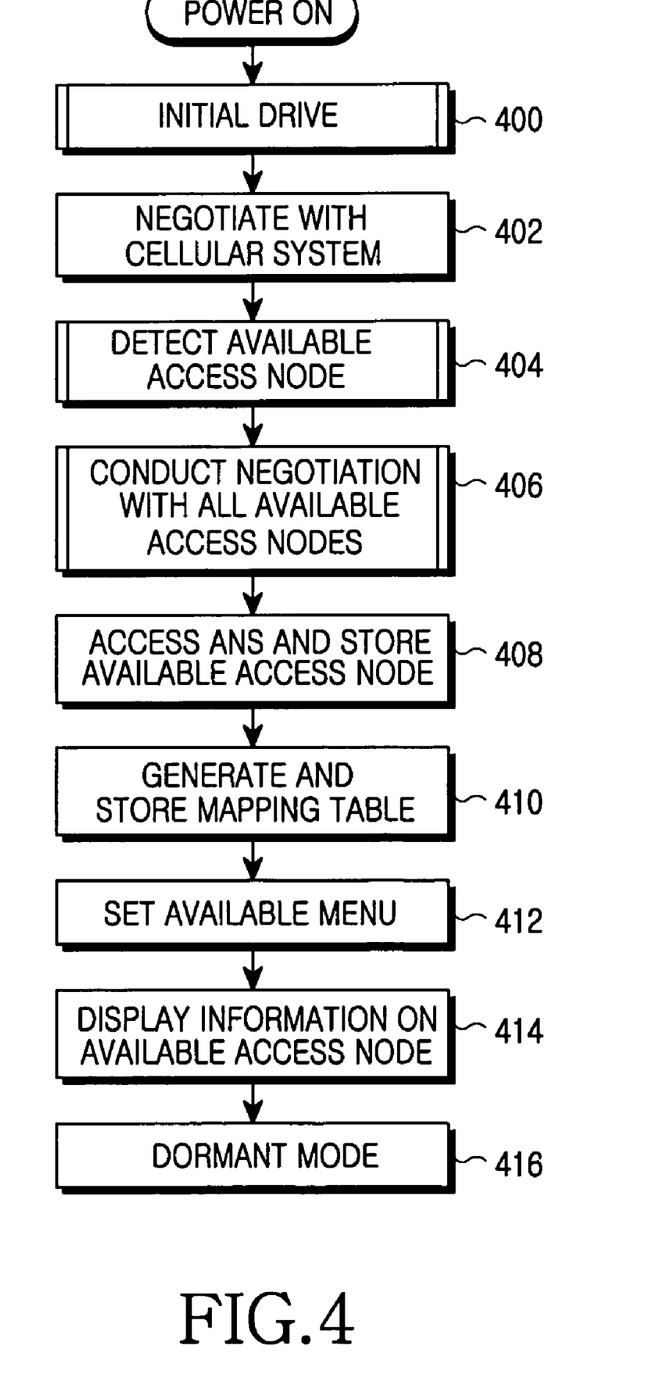
FIG. 4 is a flowchart illustrating an operation performed when a mobile station is initially powered on, according to a preferred embodiment of the present invention.

FIG. 4 is a flowchart illustrating an operation performed when a mobile station is initially powered on, according to a preferred embodiment of the present invention. With reference to FIGS. 3 and 4, a detailed description will be made of an initial operation for detecting various access networks upon power up of a mobile station and then setting up an access network according to the detection result.

When powered on, the mobile station performs an initial drive on respective devices in step 400. Here, "initial drive" is an operation of loading basic programs, determining whether wireless devices are connected normally, and generating a clock. When the initial drive is completed, the mobile station negotiates with the cellular system in step 402. That is, the mobile station negotiates with a system that is always accessible. Among the service networks illustrated in FIG. 2, the cellular system is always accessible. Therefore, the mobile station conducts an initial negotiation with the cellular system. However, if a new system that is always accessible substitutes for the cellular system in the future, the mobile station will perform negotiation with the new system. However, it will be assumed herein that the system that is always accessible is the cellular system.

After completion of the initial negotiation, the mobile station detects available (or connectable) access nodes in step 404. For such a detection method, a blind detection method, a centralized method, and a broadcasting method can be used. These methods are set up to access a particular network during standardization of the network, and the mobile station must previously store information on the detection methods for all networks. If an available node is detected in the above method, the mobile station performs negotiation with all available nodes sequentially or simultaneously in step 406. It will be assumed herein that the mobile station performs negotiation with available nodes sequentially.

If the mobile station can communicate with the hot spot cell 240 rather than the cellular system and can also communicate with the home cell 230 and the moving cell 220, the mobile station conducts sequential negotiation for initial synchronization acquisition, location registration, and session setup, with the above cells. That is, if the negotiation is performed in order of the hot spot cell 240, the home cell 230, and the moving cell 220, the mobile station performs the above negotiation with the hot sop cell 240. If the negotiation with the hot spot cell 240 is completed, the mobile station then conducts negotiation with the next cell, i.e., the home cell 230. Such a method is called a "sequential method." However, if the mobile station can simultaneously negotiate with all cells, it will simultaneously conduct negotiation with the hot spot cell 240, the home cell 230, and the moving cell 220.

If the negotiation is completed in step 406, the mobile station stores information on an available access network in the access network selector 331 in step 408. Thereafter, in step 410, the access network selector 331 of the mobile station generates a mapping table and stores information on access networks (ANs) in the mapping table as illustrated in Table 1 below.

TABLE 1

| Class of Service | Available AN | QoS |
|---|---|---|
| Class 1 | AN 1 | Max delay < 50 ms |
| Class 2 | AN 3 | Loss Rate < $10^{-9}$ |
| Class 3 | AN 2 | OP1 only service |
| Class 4 | AN 6 | OP2 only service |
| ... | ... | ... |
| Class n | AN k | Data Rate > 10 Mbps |

In Table 1, "Class of Service" indicates a type of a service provided, and one class may be matched with two or more networks. Further, "Available AN" represents available access networks with unique numbers assigned thereto. Therefore, if the available access networks are mapped with unique numbers, the mobile station will store information on the access networks in the above method. Otherwise, the mobile station will write representative names of the access networks in the mapping table. Finally, "QoS (Quality of Service)" can be a service quality parameter provided from a particular network, and if a particular network can support two or more services, the services have different QoS parameters. Therefore, one network can have two or more QoS in Table 1. In addition, although not illustrated in Table 1, accounting information can also be stored for the user's convenience.

If the mapping table is stored in this manner by the access network selector 331 in step 410, the mobile station delivers the mapping table to the higher layer 340. Then the higher layer 340 of the mobile station sets up available menus in Table 1, in step 412. Thereafter, in step 414, the higher layer 340 informs the user of the set available access nodes through the display unit. That is, the higher layer 340 displays information on the available access nodes through the display unit. At this point, a particular access node can be selected from the available access nodes by the user. Otherwise, the mobile station transitions to a dormant state in step 416. The "dormant state" is a state in which the mobile station waits for termination or origination of a call, and a request for a particular menu by the user.

If the mobile station can access a plurality of access networks through the above process, it performs initial negotiation with available access networks and informs a user of the results. Therefore, the user can access a desired access node in the access network.

Figure 5A:
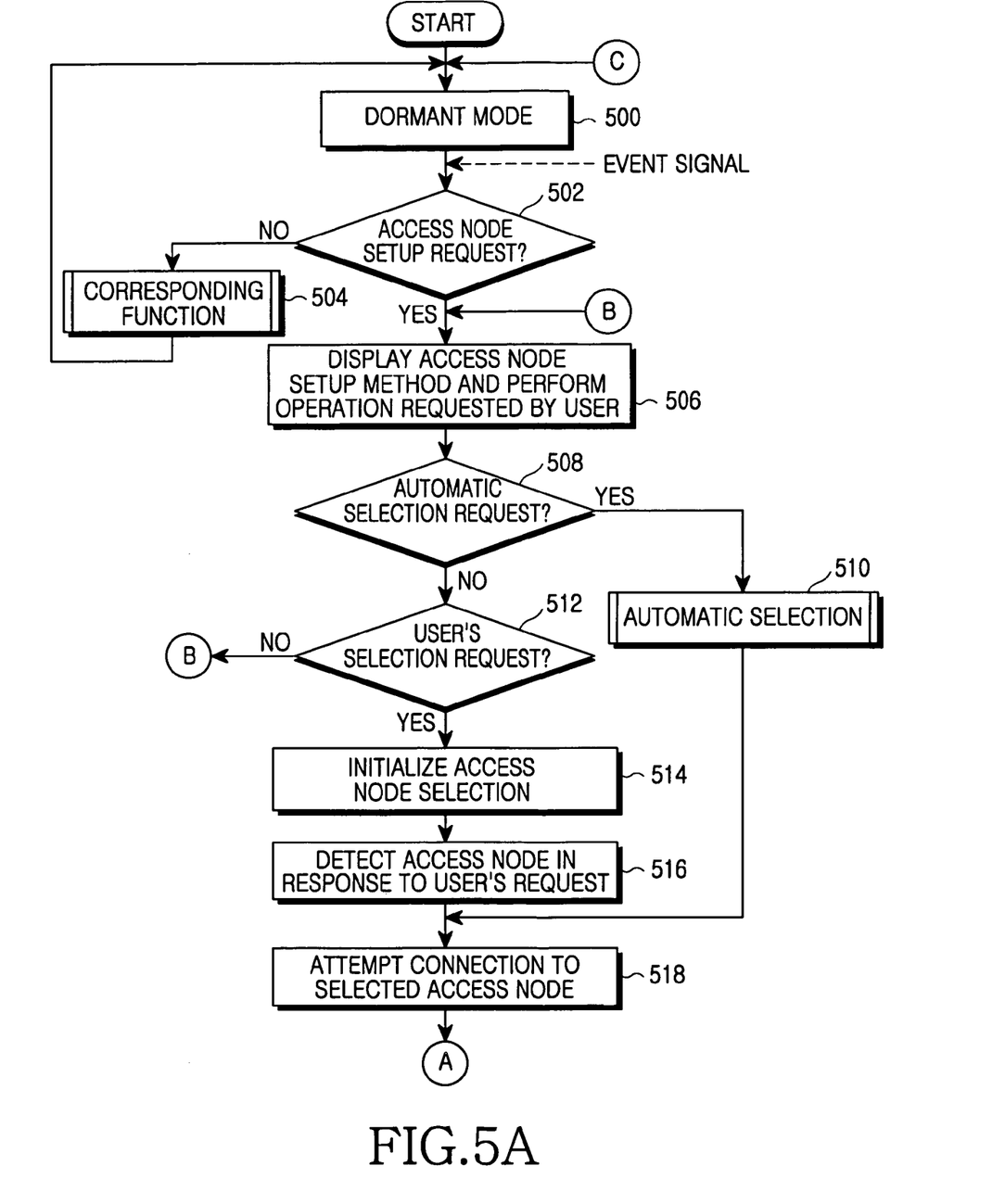
FIGS. 5A and 5B illustrate a procedure for selecting a particular access network from a plurality of available access networks by a mobile station according to a preferred embodiment of the present invention.
Figure 5B:
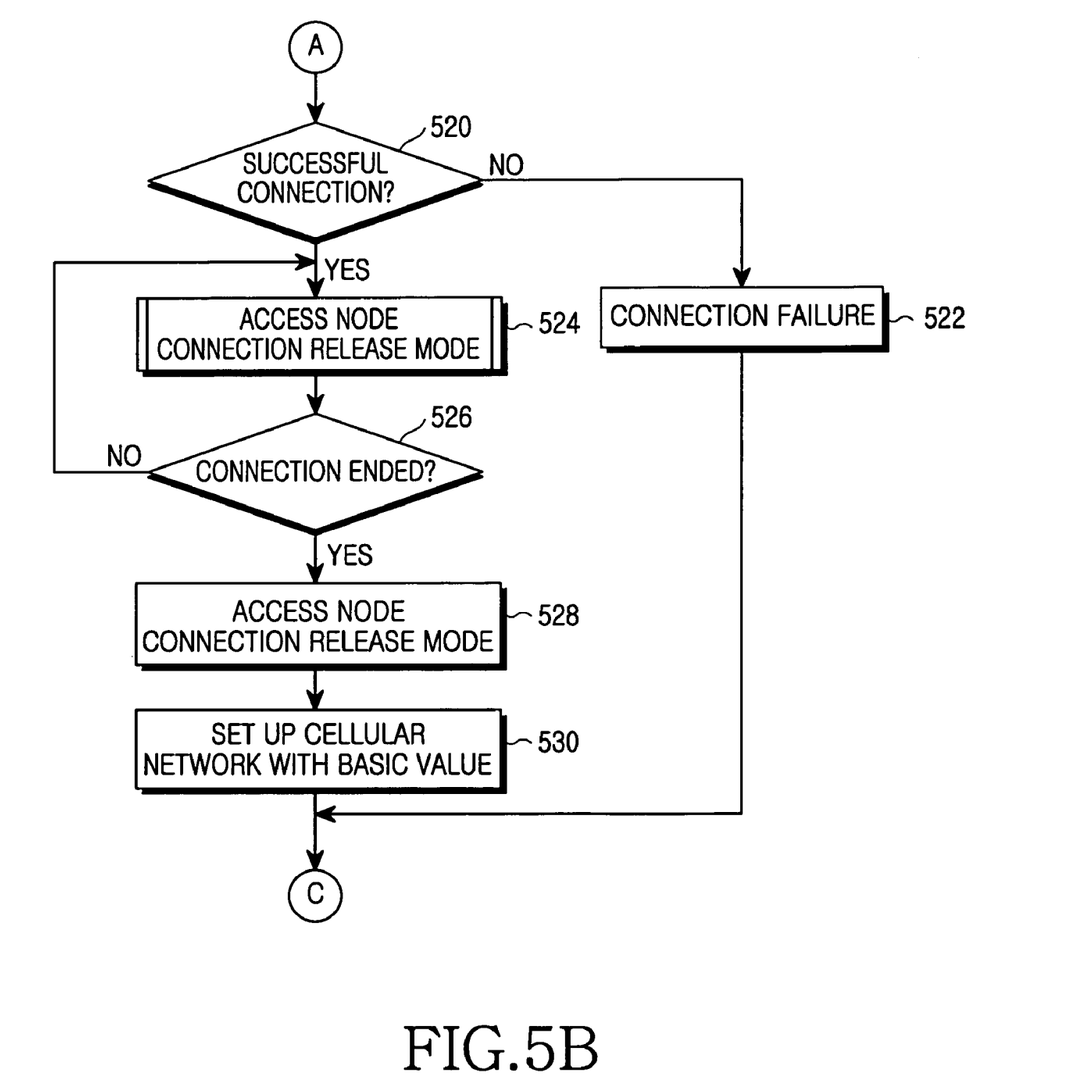

FIGS. 5A and 5B illustrate a procedure for selecting a particular access network from a plurality of available access networks by a mobile station according to a preferred embodiment of the present invention. In step 500, the mobile station holds a dormant state. The dormant state is identical to the dormant state described in step 416 of FIG. 4. If a particular event occurs in the dormant state, the higher layer 340 of the mobile station determines in step 502 whether the occurred event is an access node setup request. If it is determined in step 502 that the occurred event is an access node setup request, the higher layer 340 of the mobile station proceeds to step 506.However, if the occurred event is not an access node setup request, the higher layer 340 proceeds to step 504 to perform an operation corresponding to the occurred event, and then returns to step 500 to hold the dormant state. Because FIGS. 5A and 5B illustrate a procedure for setting up an access node, a procedure not related to the access node setup operation will not be described.

In step 506, the access network selector 331 of the mobile station displays an access node setup method on the display unit. For example, the access node setup method can include a user preference-based setup method and a class of service (CoS)-based setup method. In addition, the access node setup method may include an automatic setup method, a manual setup method, or other setup methods. The higher layer 340 of the mobile station informs the user of the service setup method through the display unit in step 506. The display is changed in response to a particular request, e.g., a menu shift request or a menu setup request, input by the user through the user input interface unit, and then a particular menu among the displayed menus is set up.

If there is an input signal during the display, the higher layer 340 of the mobile station determines in step 508 whether automatic selection is requested. If automatic selection is requested, the higher layer 340 determines a target access node on an automatic selection basis in step 510, and then proceeds to step 518. Here, "automatic selection" indicates automatically selecting a best service in terms of a service quality or a service charge. The access network selector 331 of the mobile station detects the best access node based, on the contents of Table 1 in response to the request, to thereby determine a desired access node. Thereafter, the higher layer 340 proceeds to step 518.

However, if it is determined in step 508 that the input signal received in step 506 is not an automatic selection request, the higher layer 340 of the mobile station proceeds to step 512. In step 512, the higher layer 340 determines whether a user's selection request is received. Here, "user's selection request" indicates that a request signal for selecting an access node is input by the user. If a signal for selecting a particular access node by the user is received, the higher layer 340 of the mobile station proceeds to step 514, and otherwise, continues the display process in step 506.

In step 514, an operation is performed by the access network selector 331 of the mobile station. That is, the access network selector 331 must acquire information on available access node, illustrated in Table 1. Therefore, the access network selector 331 initializes selection of an access node according to the information stored in accordance with Table 1. A display operation is performed through the display unit in order to read a mapping table and then inform the user of the read information. At this point, the information is displayed on the display unit in a format appropriate to be provided to the user. For example, it is assumed that the user desires to receive a data service such as a movie. Further, it is assumed that a network capable of performing a data service includes a satellite network, a home network, and a network having a hot spot cell. In this case, the mobile station can display QoS of each network, and names and service charges of networks. The QoS can be a data rate as illustrated in Table 1.

While performing the display, the mobile station detects available access nodes in response to a user's request, i.e., a signal that the user inputs through the user input interface unit, in step 516. If the user selects a particular network based on the request signal, the mobile station proceeds to step 518. That is, if a particular network was selected, because location registration and session negotiation were previously performed through the procedure of FIG. 4, the mobile station attempts connection to an access node of the above network.

At this point, if a new network which did not exist in the initialization procedure is set up, the mobile station can be designed to first determine whether communication with the network is possible. In addition, when a position of the mobile station is changed, the mapping table of Table 1 is continuously updated, so session negotiation may not be conducted. If session negotiation and location registration are not conducted, the mobile station performs the session negotiation and location registration in step 518.

Thereafter, the mobile station determines in step 520 whether connection was successful. That is, the mobile station determines whether connection to an access node of a network selected by the user or automatically selected by a particular condition was successful. If the connection was successful, the mobile station performs communication with the connected access node in step 524. However, when the connection is failed, the mobile station informs the user of the connection failure through the display unit or an alarm device in step 522, and then transitions to the dormant state of step 500.

Herein, determining whether a connection is successful is performed once. However, unlike the present example, the mobile station can be designed so that when connection is not made within a predetermine time, connection is attempted a predetermined number of times.

The mobile station performs communication with a particular access node in step 524, and determines in step 526 whether connection is terminated. If it is determined in step 526 that connection to the connected node is desired to be released, i.e., if a connection release signal is received from the user or the network, the mobile station performs a connection release mode to the node, in step 528. Such a connection release mode is performed in a method determined by the network, for release of call connection. After the connection release, the mobile station sets up the cellular network with a basic value in step 530. At this point, if there is a method set by another network other than the cellular network or by the user, the mobile station may set up an appropriate access node with a basic value according to the method. After setting up a basic communication network in this way, the mobile station transitions back to the dormant state of step 500.

As described above, when a plurality of networks exist, a user can select a particular network for communication in consideration of his preference or the type and QoS of a desired service.

Figure 6A:
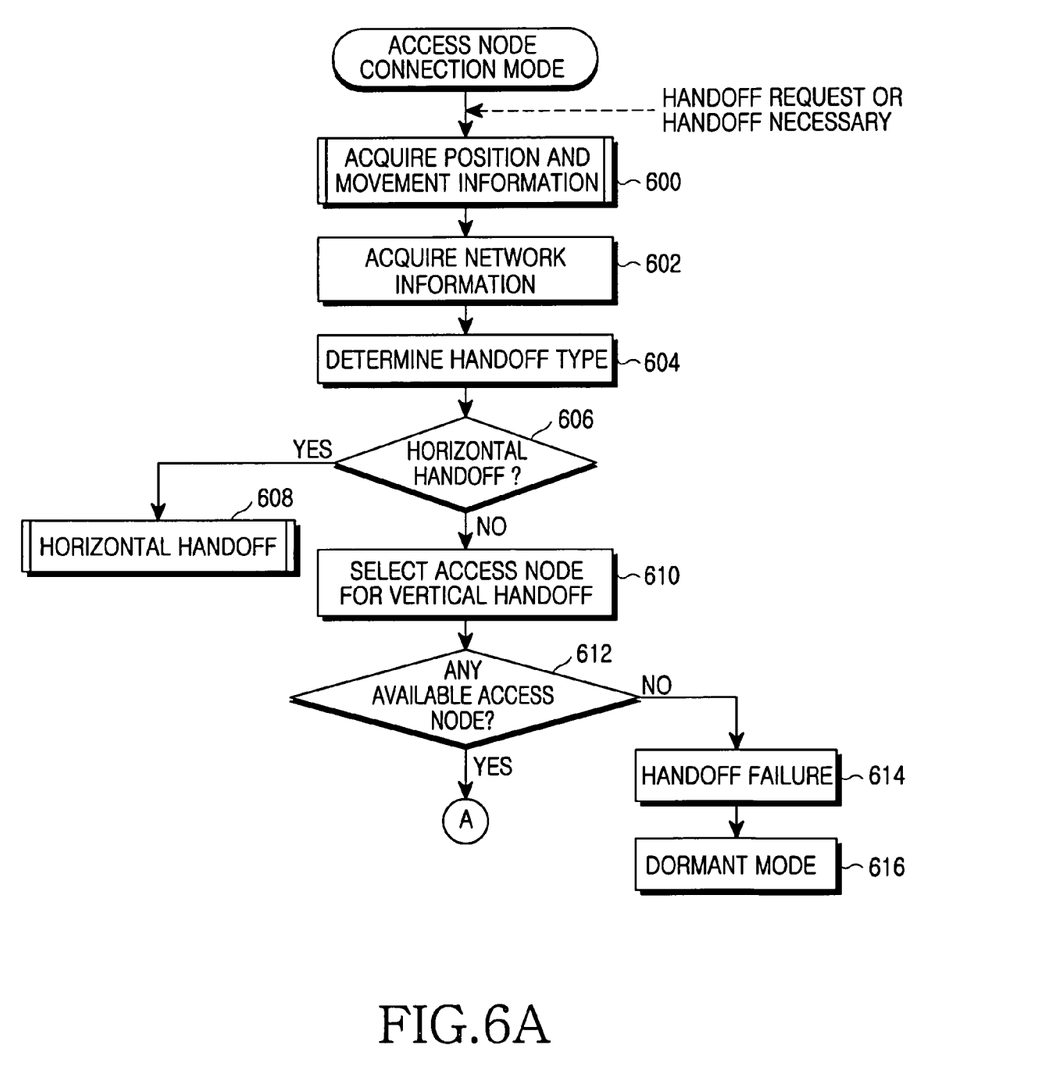
FIGS. 6A and 6B illustrate a procedure for performing a handoff of a mobile station when a plurality of networks exist and the mobile station is communicating with a particular node, according to a preferred embodiment of the present invention.
Figure 6B:
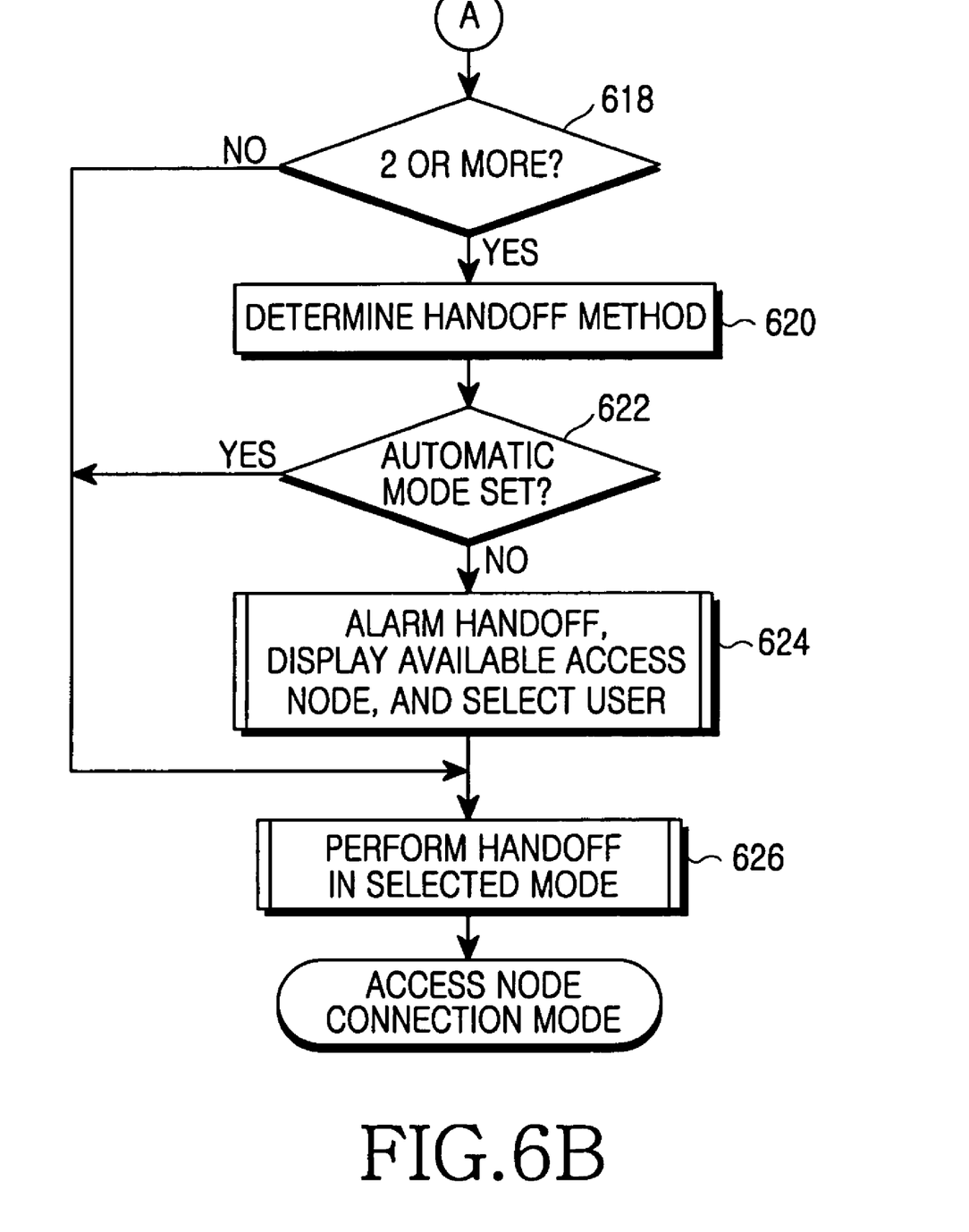

FIGS. 6A and 6B illustrate a procedure for performing a handoff of a mobile station when a plurality of networks exist and the mobile station is communicating with a particular node, according to a preferred embodiment of the present invention. The procedure of FIGS. 6A and 6B is a sub-procedure during handoff in the access node connection mode corresponding to the step 524 of FIG. 5B. When handoff is not performed, i.e., when a position of the mobile station is fixed, the procedure of FIGS. 6A and 6B is not performed. In addition, even when a network that the mobile station accessed is the moving cell 220 illustrated in FIG. 2 and the mobile station moves together with the moving cell 220, the procedure of FIGS. 6A and 6B is not performed. However, when a position of the mobile station is changed and the mobile station does not move along with the moving cell 220, the procedure of FIGS. 6A and 6B is performed.

While the mobile station is performing a connection mode to an access node in a particular network, a handoff request message can be received or handoff can be required by the mobile station. Determining whether a handoff request message is received from the network or whether the mobile station itself requires handoff is implemented according to specification of the network. Therefore, a detailed description thereof will not be made herein. If a handoff request message is received or handoff is required while performing the access node connection mode, the mobile station proceeds to step 600. In step 600, the mobile station acquires location and movement information of the mobile station itself. This will be described herein below with reference to a general cellular mobile communication system.

The mobile station, when it is located in a cellular network, knows a cell to which it belongs, and can detect a distance from an access node from received pilot power. In addition, the mobile station can acquire movement information by measuring the pilot power. In this case, if the mobile station moves from a current cell to a new cell, pilot power of the current cell is decreased while pilot power of the new cell is increased. Therefore, the mobile station can detect its target (or destination) cell through a neighbor list received from a base station. Thus, the mobile station performs a soft handoff or a hard handoff using the neighbor list.

However, the present invention cannot perform an operation in this method, because in some cases, a particular network cannot perform handoff to the same network. Therefore, the mobile station detects a pilot signal from the cellular system, and if it is determined that the mobile station is getting away from the current access node, the mobile station detects the necessity of a handoff. After detecting the necessity of the handoff and acquiring movement information based on a change in pilot power, the mobile station proceeds to step 602. In step 602, the mobile station acquires information on the current network. Such an operation can be performed by the access network selector 331 of the mobile station. After acquiring the network information, the mobile station determines a handoff type in step 604.

The handoff type can be classified into horizontal handoff and vertical handoff. The horizontal handoff is a handoff to the same network, while the vertical handoff is a handoff to a different network. Therefore, in a strict sense, the vertical handoff is technically a linkage of a service rather than handoff. That is, if handoff is available in almost all areas like in the cellular system, the horizontal handoff is performed. Otherwise, the vertical handoff is necessary. Therefore, the mobile station acquires information indicating whether an access node available for horizontal handoff exists in an adjacent area, by itself or from the information provided from the network. The handoff type is determined by such information.

After determining a handoff type in step 604, the mobile station determines in step 606 whether the determined handoff type is horizontal handoff. If it is determined in step 606 that the determined handoff type is horizontal handoff, the mobile station performs horizontal handoff in step 608. That is, the mobile station performs handoff in the same method as performed in the cellular system. However, if the horizontal handoff is impossible, i.e., if vertical handoff should be performed, the mobile station proceeds to step 610. In step 610, the mobile station selects an access node for a vertical handoff using the access network selector 331. In this case also, the information of Table 1 described in conjunction with FIG. 3 is used. That is, the mobile station selects the most similar network to determine an available handoff target access node.

In an automatic selection mode, the mobile station will select a network so that handoff is performed to a network nearest to a criterion set by the user while satisfying a QoS level of the current service. When the user randomly selects a network, the mobile station will select a network that performs a service in the most similar manner to the randomly selected network. In addition, the mobile station can enable the user to previously select a particular handoff method and store the corresponding information. In this case, the network selected by the user or a criterion for selecting a network is determined according to the above method. This will be described in more detail herein below.

In this method, an available handoff target access network is selected. Thereafter, the mobile station determines in step 612 whether there is an available access node. If it is determined in step 612 that there is an available access node, the mobile station proceeds to step 618. However, if there is no available access node, the mobile station proceeds to step 614 due to impossibility of handoff. In step 614, the mobile station performs a handoff failure process. That is, because of the handoff failure, the mobile station informs the user of the handoff failure or performs call drop or suspension procedure. Thereafter, the mobile station enters a dormant mode in step 616. Here, the dormant mode is identical to the dormant mode described in conjunction with FIGS. 4, 5A, and 5B.

However, when a handoff is possible, the mobile station determines in step 618 whether the number of available networks is at least two. That is, the mobile station determines whether there are at least two access nodes available, while continuously holding the current service through another network. When necessary, the mobile station can be designed to continue the current service after its temporary suspension. The present invention determines existence of available handoff target networks, i.e., networks in which a current service can be continuously provided, and the number of the networks. If it is determined in step 618 that there are at least two available networks, the mobile station proceeds to step 620, and otherwise, if connection is possible through only one network, the mobile station proceeds to step 626.

In step 620, the mobile station determines a handoff method. That is, the mobile station determines whether the user has set the handoff method to an automatic mode or a manual mode. If it is determined in step 622 that the user has set the handoff method to an automatic mode, the mobile station selects any one of the at least two available networks by a predetermined criterion, and then proceeds to step 626. Otherwise, the mobile station proceeds to step 624.

In step 624, the mobile station informs the user of the necessity of a handoff through the display unit or the alarm device. In addition, the mobile station displays network types of the available access node for the user through the display unit. Accordingly, if the user inputs a selection signal to the mobile station through the user input interface unit, the mobile station receives the selection signal. If several networks should be displayed but cannot be displayed on one screen, a display area can be displayed by moving the cursor or scrolling the screen. In addition, one of the displayed contents can be randomly selected by the user. If a signal is selected in this manner, the mobile station proceeds to step 626.

In step 626, the mobile station performs a handoff to the selected node. Here, the selected node can become only one available node determined in step 618, and if the number of available networks is at least two, the selected node can become a node selected in the automatic method in step 622 or a node randomly selected by the user.

Even when a position of the mobile station's user is changed, an access network can be randomly selected base on the user's criterion, enabling the user to receive a desired service via a network selected according to preference.

As described above, the mobile station previously detects available networks and stores the detection results, to thereby select a network according to user's preference even when communication is necessary or handoff is performed. By doing so, it is possible to reduce complexity of the mobile communication system.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for selecting an access network in a mobile station capable of receiving a service from a multi-wireless communication network, the apparatus comprising:
   a physical layer for communicating with the multi-wireless communication network;
   an access network selector for storing information on an available access network detected using a predetermined detection algorithm, and generating and storing a mapping table corresponding to the stored information; and
   a higher layer for setting available menus based on the mapping table and informing the information on the available access network through a display unit,
   wherein the information includes a class of service field representing a type of a service, an available access network field representing the available access network and a Quality of Service field representing a service quality parameter provided from a particular available access network, and the predetermined detection algorithm represents a blind detection algorithm, a centralized detection algorithm and a broadcasting detection algorithm.

2. The apparatus of claim 1, further comprising a memory for storing a selection criterion of the multi-wireless communication network and a handoff method for each available service.

3. A method for selecting an access network in a mobile station capable of receiving a service from a multi-wireless communication network, the method comprising the steps of:
   during an initial drive, detecting at least one available access network, and generating and storing a mapping table corresponding to the detection result; and
   when communication is requested, providing a user with information on the available access network from information stored in the mapping table, and communicating with a particular access network selected by the user,
   wherein the information includes a class of service field representing a type of a service, an available access network field representing the available access network and a Quality of Service field representing a service quality parameter provided from a particular available access network.

4. The method of claim 3, further comprising the steps of:
   detecting an available handoff target access network from the mapping table, if a vertical handoff is necessary; and
   if a handoff method is set to an automatic mode, selecting a handoff target access network from the detected at least one available handoff target access network automatically.

5. The method of claim 3, further comprising the steps of:
   detecting an available handoff target access network from the mapping table, if a vertical handoff is necessary; and
   if a handoff method is set to a manual mode, providing the user with information on the detected at least one available handoff target access network and performing handoff to an access network selected by the user.

6. The method of claim 3, further comprising the step of determining a predetermined particular access network as a basic network when the communication is terminated.

* * * * *